United States Patent [19]
Vecchi et al.

[11] Patent Number: 5,898,693
[45] Date of Patent: Apr. 27, 1999

[54] SPECTRUM MANAGER FOR COMMUNICATION NETWORK

[75] Inventors: Mario P. Vecchi, Aurora; Jay Vaughan, Castle Rock, both of Colo.

[73] Assignee: Time Warner Entertainment Company L.P., Stamford, Conn.

[21] Appl. No.: 08/400,792

[22] Filed: Mar. 8, 1995

[51] Int. Cl.$^6$ ....................................................... H04J 13/00
[52] U.S. Cl. ............................................ 370/446; 370/480
[58] Field of Search ................................ 370/69.1, 110.1, 370/94.1, 60, 60.1, 94.2, 94.3, 50, 30, 57, 56, 18, 85.6, 70, 71, 73, 76, 124, 478, 479, 480, 485, 486, 489, 496, 477, 341, 344, 441, 446, 252; 341/825.5, 825.51, 825.52, 825.02; 375/205, 200, 202; 359/120, 121, 118; 275/202, 212; 348/10, 11, 7, 246; 455/54.2, 6.1

[56] References Cited

U.S. PATENT DOCUMENTS

| | | | |
|---|---|---|---|
| 4,987,480 | 1/1991 | Lippman et al. | 348/396 |
| 5,014,125 | 5/1991 | Pocock et al. | 348/7 |
| 5,027,400 | 6/1991 | Baji et al. | 380/20 |
| 5,414,699 | 5/1995 | Lee | 370/69.1 |
| 5,425,027 | 6/1995 | Baran | 370/69.1 |
| 5,513,379 | 4/1996 | Benveniste et al. | 455/33.1 |

OTHER PUBLICATIONS

Product Brochure for "HP Open View Distributed Management Products," (4 pages total), Hewlett Packard.
Product Brochure for "HP Open View Network Node Manager," (4 pages total), Hewlett Packard, 1994.
Product Brochure for "HP Open View Extensible SNMP Agent," (4 pages total), Hewlett Packard, 1992.

Primary Examiner—Dang Ton
Attorney, Agent, or Firm—Holland & Hart llp

[57] ABSTRACT

A spectrum manager and a spectrum management method for a communication network. The preferred embodiment is a method of controlling the transmission of multiple information streams in a communication network comprising the steps of providing a communication network and a plurality of information streams corresponding to a plurality of analog and digital services provided by the network; assigning to each information stream one or more spectrum slices within a predetermined frequency spectrum so that each information stream has a different spectrum slice(s) assigned to it; transmitting the information streams over the communication network within the information streams' assigned spectrum slices; assigning to at least one information stream a new spectrum slice within the predetermined frequency spectrum; and transmitting the information streams over the communication network within the information streams' assigned spectrum slices. The invention also includes a communication network comprising a distribution hub; user stations; signal carriers between the distribution hub and the user stations; a network controller comprising function for controlling transmission spectrum slice for service information streams transmitted from the distribution hub to user stations and from user stations to the distribution hub and function for changing a parameter of a transmission spectrum slice.

29 Claims, 4 Drawing Sheets

SPECTRUM MANAGER FOR COMMUNICATION NETWORK

BACKGROUND OF THE INVENTION

This invention relates generally to a radio frequency spectrum manager and spectrum management method for a communication network. In particular, the invention relates to a radio frequency spectrum manager and spectrum management method for a hybrid optical fiber/coaxial cable communication network delivering two-way digital and/or analog information streams.

Existing cable networks provide analog cable television programming from a central source location (known as the "head end") to multiple users in receiver locations such as homes, business, etc., for display on television sets. Some receiver locations are able to send information back to the head end, usually through use of a set-top converter box. This return information can be in the nature of a request for certain programming from the head end, e.g., a pay-per-view program.

The forward and reverse information streams are typically transmitted between the head end and the receiver locations over a network of coaxial cable and/or optical fibers. The information streams are formed into radio frequency bands, such as by the use of Quadrature Amplitude Modulation (QAM), before transmission. The signals are demodulated into a usable form at the receiving end.

Most prior art cable networks provide their analog video programming to users within a first dedicated spectrum band and receive return information from users within a second dedicated spectrum band. The video programming is arranged in preset channels (e.g., 6 MHz channels) within the forward spectrum band so that the receiving television set can be tuned to display the desired program.

New cable networks have been proposed to deliver a combination of analog and digital information to a user in a home or other location and to receive analog and/or digital information from the user. These cable networks may provide a combination of digital and analog television programming, video-on demand, home shopping services, interactive video games, telephone service, etc. While most of this information will be transmitted from a distribution hub or head end to multiple users, a significant stream of information will be transmitted in the reverse direction from the users to the distribution hub. Similar concepts have been proposed for transmission of these services and information over telephone lines.

Baji et al. U.S. Pat. No. 5,027,400 describes a cable communication system that permits the insertion of commercial advertisements into video programming at a subscriber's request. In one embodiment (shown in FIGS. 2—2 and 26 and described at col. 17, line 49), the system uses a traffic monitor/channel exchange control unit to dynamically change allocated channels. The control unit monitors requests from subscribers, the amount of video data to be transferred, etc., to issue an exchange control signal for establishing an optimal channel share condition.

Pocock et al. U.S. Pat. No. 5,014,125 describes an interactive television system in which a subscriber can request a particular program or application from sources at a head end. Once a logging and initiation procedure has been completed, a navigation session task selects and opens a viewing session with a video display task which communicates with a control unit. The video display task is supplied with the user terminal address and the transmission path ID for the session. If the channel specified by the transmission path ID is operating at full capacity, and if transmission capacity is available on an alternate channel, the video display task can send a control message to the user terminal to instruct it to tune to an alternate channel.

SUMMARY OF THE INVENTION

As more and more services are provided on a communication network, the forward and reverse information streams generated by the services will be competing for the network's limited transmission spectrum. One drawback of prior art cable communication systems is their limited ability to maximize the amount of information transmitted over the communication network through the control of the transmission spectrum.

This invention provides a spectrum manager and a spectrum management method for a communication network. The preferred embodiment is a method of controlling the transmission of multiple information streams in a communication network comprising the steps of providing a communication network and a plurality of information streams corresponding to a plurality of services provided by the network; assigning to each information stream one or more spectrum slices within a predetermined frequency spectrum so that each information stream has one or more different spectrum slices assigned to it; transmitting each information stream over the communication network within the information stream's assigned spectrum slice(s); assigning to at least one information stream a new spectrum slice within the predetermined frequency spectrum; and transmitting each information stream over the communication network within the information stream's assigned spectrum slice(s).

The invention also includes a communication network comprising a distribution hub; user stations; signal carriers between the distribution hub and the user stations; a network controller comprising means for controlling transmission spectrum slices for service information streams transmitted from the distribution hub to user stations and from user stations to the distribution hub, and means for changing parameters of a transmission spectrum slice.

The invention is described in more detail below with reference to the drawings.

DETAILED DESCRIPTION OF THE PREFERRED EMBODIMENTS

Figure 1:
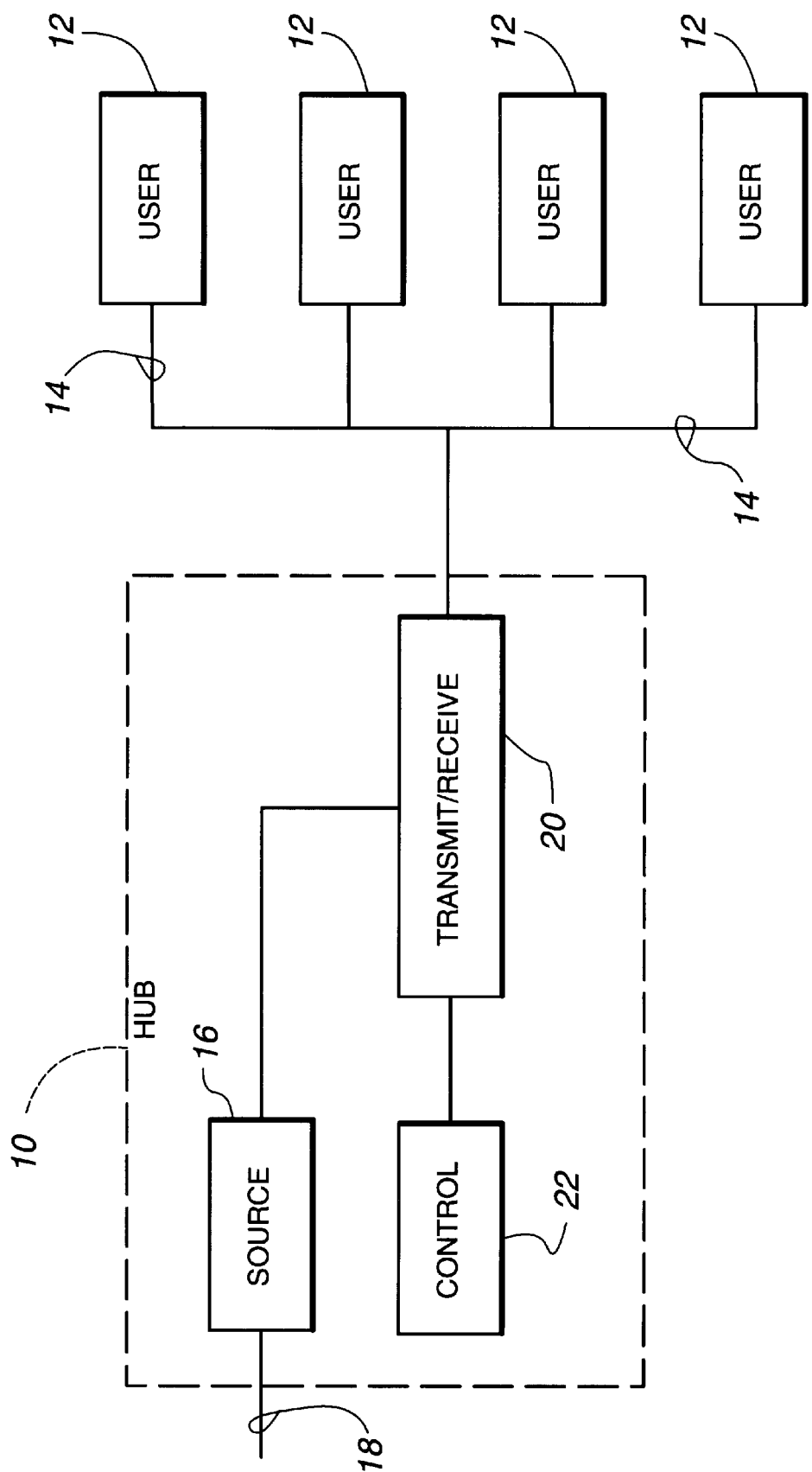
FIG. 1 is a block diagram of a communication network.

FIG. 1 is a block diagram of a communication network providing a plurality of services from a distribution hub 10 to users located at user stations 12. The services provided by the network may be, e.g., analog television, digital video, digital computer data communication, video games, telephony and the like. Each of these services requires an information stream to be sent from the distribution hub to at least one of the user stations 12 over signal carriers 14. A service may also require an information stream to be sent from one or more user stations to the distribution hub via the signal carriers. The signal carriers are, e.g., coaxial cable, fiber optic cable, telephone lines, or any other suitable analog and/or digital information stream carriers.

Distribution hub 10 may include one or more sources 16 of information streams. Alternatively, distribution hub 10 may receive one or more information streams for the services from an external source (not shown), such as the head end of a cable network or another distribution hub, along an optional signal carrier 18.

The services' analog and/or digital information streams are transmitted from the local sources 16 or an external source to the user stations over the signal carriers 14 by a transmitter/receiver 20. Transmitter/receiver 20 also receives any information streams sent from user stations. Transmitter/receiver 20 also performs any switching function required for the information stream flow.

A network controller 22 controls the operation of the transmitter/receiver 20 and the interaction of the user stations 12 with the rest of the network. Many of the functions of network controllers are well-known and form no part of this invention. In addition to performing prior art network controller functions, however, network controller 22 dynamically controls the spectrum slices over which the forward and (if applicable) the reverse information streams are transmitted by the transmitter/receiver 20 and the user stations 12. This function of network controller 22 is illustrated by FIGS. 2(*a*) and 2(*b*).

Figure 2A:
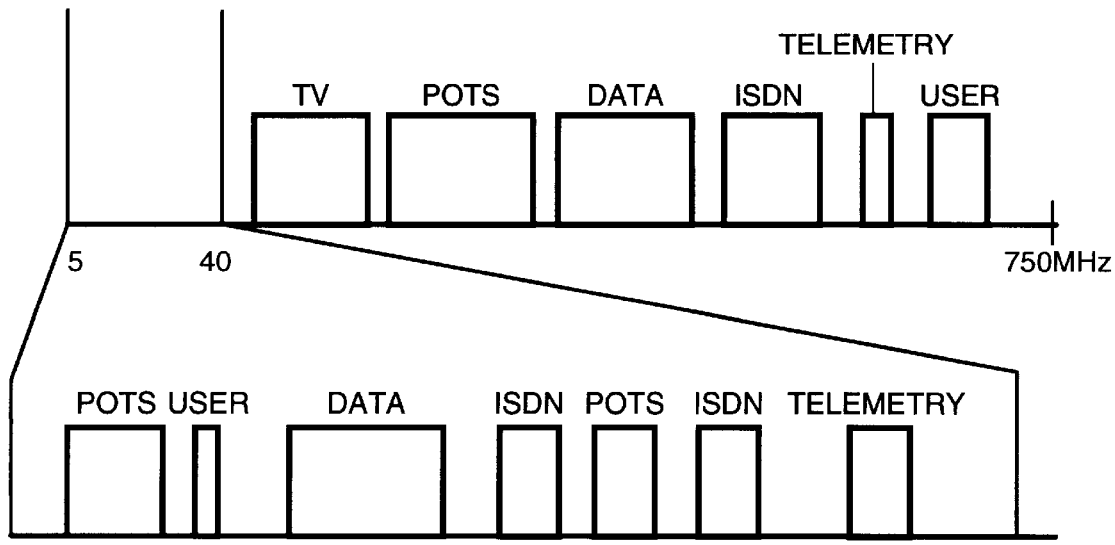
FIG. 2(a) is a chart showing one possible spectrum slice allocation scheme in a communication network.
Figure 2B:
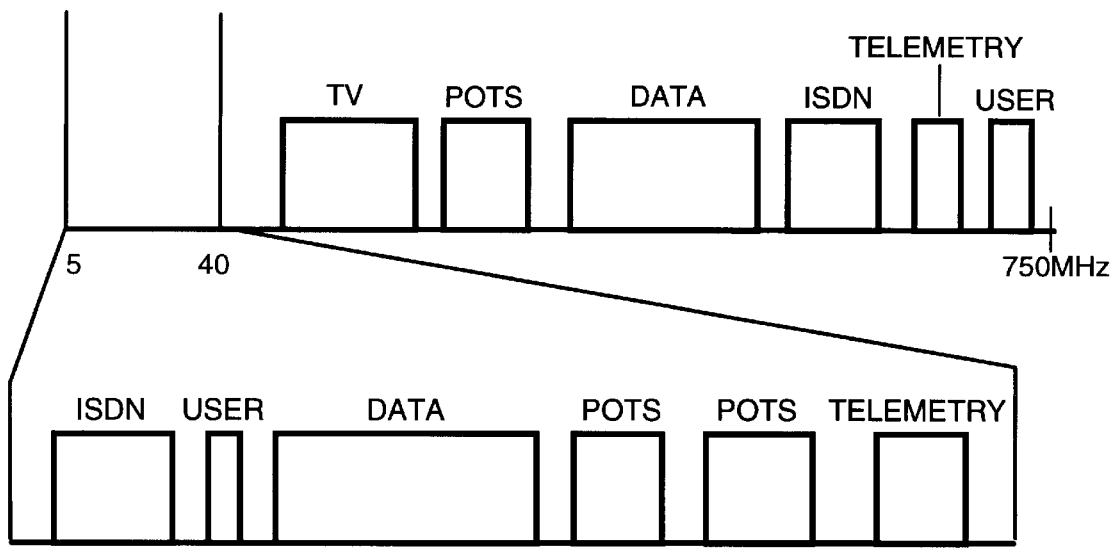
FIG. 2(b) is a chart showing spectrum slice allocation in the communication of FIG. 2(a) at a later time.

FIGS. 2(*a*) and 2(*b*) are schematic representations of the transmission spectrum of a communication network providing multiple services. In this example, the services are analog television, telephony (POTS or "Plain Old Telephone Service"), high-speed digital data transfer for computer applications, ISDN ("Integrated Services Digital Network," a public telecommunications network which itself can provide a variety of services), and telemetry. In this network, transmitter/receiver 20 and the user stations modulate each information stream for transmission in specific slices of a transmission spectrum. All forward information streams are transmitted from the transmitter/receiver in the 50 to 750 MHz portion of the spectrum, and all reverse information streams are transmitted from the user stations in the 5 to 40 MHz portion of the spectrum.

Controller 22 dynamically controls the parameters of the spectrum slice assigned to each information stream, either automatically or with operator intervention, to optimize the flow of information streams through the network. For example, the spectrum slices assigned to the various information streams at a first time T is shown in FIG. 2(*a*). In the forward direction, analog television is assigned 50 to 200 MHz, POTS 220 to 300 MHz, high-speed data 320 to 400 MHz, ISDN 420 to 480 MHz, telemetry 500 to 520 MHz, and communication from the network controller to the user stations 600 to 640 MHz. At the same time, the reverse information streams are assigned slices as follows: POTS 6 to 10 MHz and 30 to 32 MHz, communication from the user stations to the network controller 12 to 14 MHz, high-speed data 15 to 25 MHz, ISDN 26 to 29 MHz and 33 to 35 MHz, and telemetry 36 to 38 MHz.

The network controller monitors operation of the network, e.g., by determining service usage, service priority, transmission system noise and interference. If the network controller determines that reassignment of the spectrum slices used by an information stream would improve the efficiency of the network's operation, the network controller can change the spectrum slice parameters (such as spectrum slice width and center frequency) of that information stream's spectrum slice. For example, if demand for usage of one or more services increases, and demand for usage of one or more services decreases, the network controller can reallocate slices of the available transmission spectrum among the various services to more efficiently meet the changed service usage.

In the same way, if the priority of one service over another changes for some reason (such as where a service is part of a sales promotion or where certain service providers pay a premium to obtain a higher priority on the network), the network controller can reallocate spectrum slices accordingly. Also, if the network controller determines that noise or other interference in the transmission system is disrupting transmission through certain slices of the spectrum, the network controller can reallocate spectrum slices to avoid the noisy part(s) of the spectrum.

Thus, at time T+1, the allocation of spectrum among the forward and reverse information streams in this example could be as shown in FIG. 2(*b*). Note that while some of the information streams retained their assigned spectrum slices, others were reassigned to new spectrum slices (See, e.g., the rearrangement of the POTS, data and ISDN spectrum slices).

Figure 3:
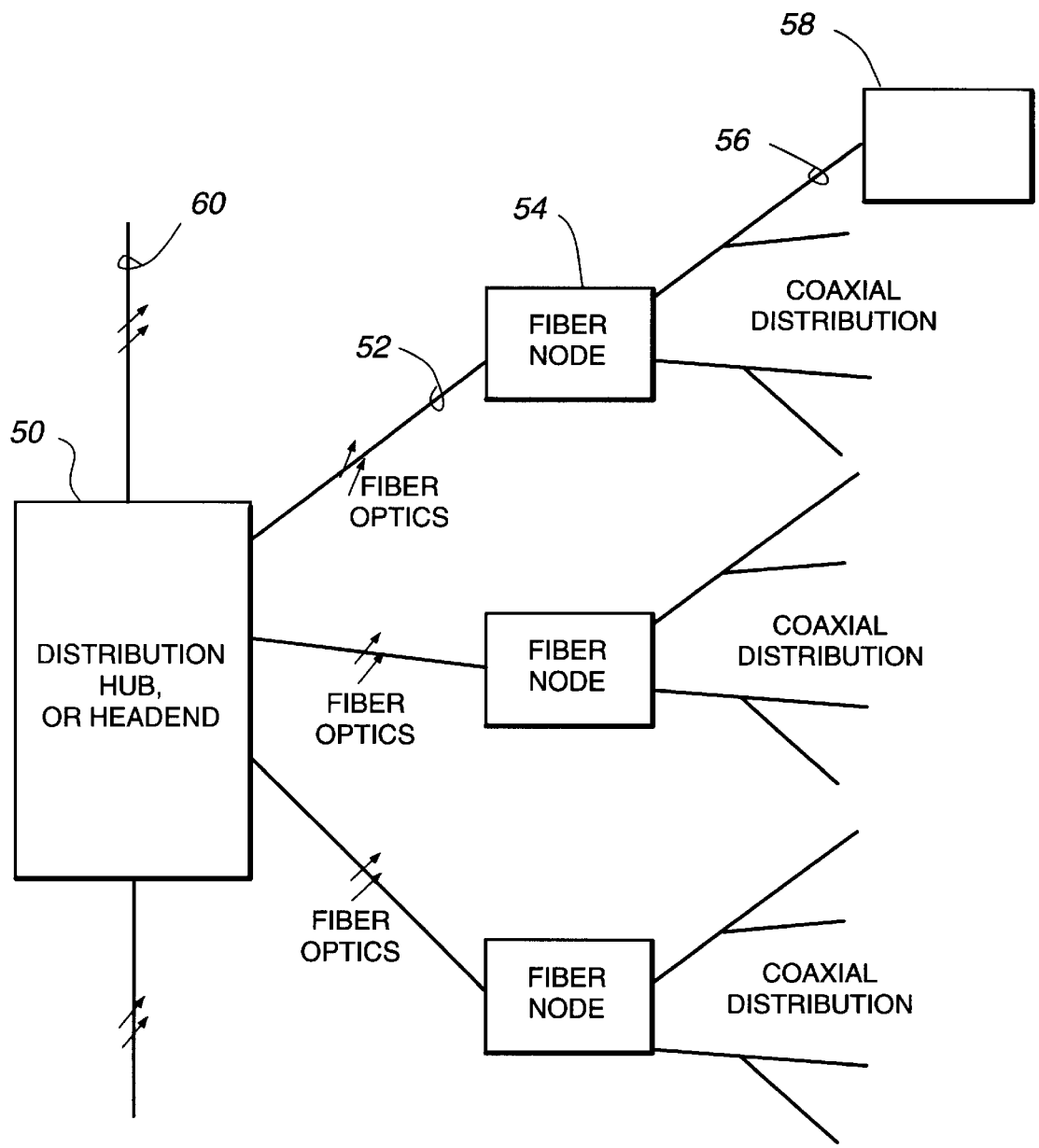
FIG. 3 is a block diagram showing a communication network according to this invention.

The preferred embodiment of this invention is implemented in a cable communication network. As shown in FIG. 3, analog and digital services are provided from a distribution hub or head end 50 through fiber optic cables 52 to fiber nodes 54. Standard coaxial cables 56 lead from the fiber nodes to multiple user stations 58. The distribution hub or head end may be connected to other distribution hubs or to a primary network head end through a fiber transport network (shown schematically as element 60) in a manner known in the art. The way in which services providing analog and digital information streams may be provided by the head end to user stations over the fiber optic and coaxial cables is well-known and need not be described here.

A network controller is disposed at the head end. In the preferred embodiment, the network controller is a UNIX-based workstation (such as a Silicon Graphics, Inc. INDIGO workstation, a Digital Equipment Corp. Alphastation, or a Sun Microsystems SPARC workstation) located at the head end. Other controllers known in the art may also be used. Each user station is a combination of a television, a computer with respective modem interface, a telephonic interface or microprocessor-based terminal device (i.e., a "set-top box").

In this embodiment, separate analog and digital information streams are transmitted from the head end to the user stations over the signal carriers (i.e., the combination of fiber optic cables and coaxial cables). Analog and/or digital information streams are also transmitted back from the user stations to the head end over the signal carriers. The forward and reverse transmission is controlled by a network controller at the head end and by the computers or microprocessors at the individual user stations. Each forward and reverse information stream, whether analog or digital, is modulated for transmission within a specified slice of the overall transmission spectrum. The manner in which such modulation and transmission is accomplished is well-known in the art.

Figure 4:
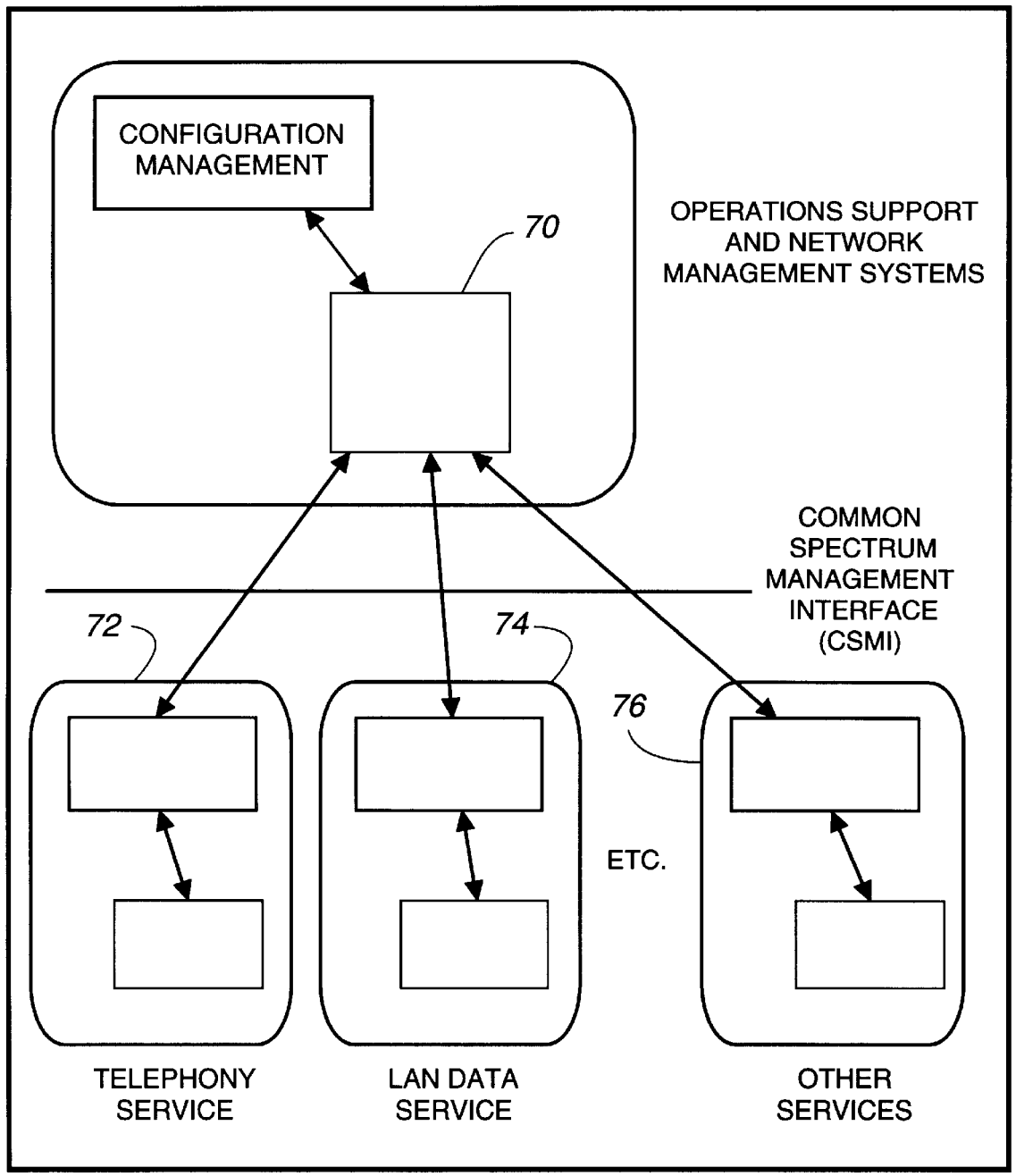
FIG. 4 is a schematic diagram illustrating the functional architecture of the spectrum manager portion of the communication network of this invention.

In the preferred embodiment of this invention, a software module called the Spectrum Management Application (SMA) runs on the network controller at the head end, as shown schematically in FIG. 4. The SMA 70 interacts with individual analog and digital services 72, 74 and 76 to control the forward and reverse spectrum slices the services use to transmit their information streams. The software interface between the SMA and the various services is preferably common to all services, as indicated by the CSMI in FIG. 4. The SMA process controls the managed objects of each service through the well-defined CSMI interface. The managed objects for each service are either co-located at the head-end or are controlled remotely over a communications link. Each service is designed to control its own operation within its assigned spectrum slice(s). The managed object represents the abstract description of the service module, and it includes the physical elements at the head end (element 73) as well as the user station interfaces (element 71).

To maximize network control efficiency, the SMA and each service should be designed to interface in the same general way whenever possible. To this end, the network is preferably managed according to the Simple Network-Management Protocol (SNMP), a collection of industry standard specifications for network management. The network may alternatively conform to version two of SNMP (SNMPv2) so that security features can be implemented or, for Open Systems Interconnection (OSI) systems, to Common Management Information Service/Common Management Information Protocol (CMIS/CMIP). The design and operation of managed networks operating under these protocols are well-known. See, e.g., Stallings, W., "SNMP, SNMPv2, and CMIP," (1993)).

Under either of the SNMP protocols, the network controller interacts with other elements (i.e., agents and objects) of the network according to specified variables and functions. Control of the spectrum slice devoted to each forward and reverse information stream is part of the network management function. This kind of SNMP network control function can be provided by commercially available software, such as Hewlett-Packard OpenView products. These products are described in the following Hewlett-Packard publications, which are incorporated herein by reference: HP OpenView Distributed Management Products (1994); HP OpenView Network Node Manager (1992); HP OpenView Extensible SNMP Agent (1994).

According to either SNMP or SNMPv2, each service to be provided on the network is designed to interact with the rest of the network by using three basic functions (Get, Set and Trap) and using a defined set of variables (collectively referred to as the Management Information Base (MIB)). The services are agents managed by the SMA, and the variables are managed objects that represent aspects of the service agents. The SMA monitors and controls service agents by retrieving and/or modifying the values of variables in the MIB. Together, the SNMP (or SNMPv2) and the MIB form the common interface between the SMA and any services provided on the network, as indicated by CSMI in FIG. 4.

In addition, since a given service is likely to incorporate aspects implemented at the head end and/or a distribution hub and/or the set-top boxes, a managed object could itself be an agent managing objects in these locations. The internal implementation of the service will, however, be transparent to the operation of the SMA using the common interface.

The variables chosen for the MIB are matters of design choice dependant in part on the services provided by the network and in part on the equipment used to provide the services. Typical variables include (1) size of spectrum slice; (2) position of spectrum slice; (3) tuning range; (4) tuning resolution; (5) service description; (6) service priority; and (7) service performance parameters. Other variables may be used, of course, without departing from the scope of the invention.

In the preferred embodiment, the SMA runs on the network controller at the head end. In alternative embodiments, the SMA could run at a distribution hub or even from a location remote from the network. In any event, the SMA treats each fiber node independently. In this way, spectrum allocation can be optimized to the conditions of the approximately 500 user stations connected to the fiber node.

Alternatively, it is also possible to group a number of fiber nodes into a single logical node that can be managed by the SMA as a group of nodes with the same spectrum assignment.

Other modifications will be apparent to those skilled in the art.

What is claimed is:

1. A method of controlling the transmission of multiple information streams in a communication network, the information streams corresponding to a plurality of independently controlled services provided by the network, the method comprising the steps of:

assigning to each information stream at least one spectrum slice within a predetermined frequency spectrum;

transmitting the information streams over the communication network within the information streams' assigned spectrum slices;

reassigning at least one information stream to a new spectrum slice within the predetermined frequency spectrum; and transmitting the information streams over the communication network within the information streams spectrum slices.

2. The method of claim 1 wherein each of said assigning and reassigning steps comprises setting a parameter of a spectrum slice, the parameter being in the group consisting essentially of: tuning range, spectrum slice width, spectrum slice center frequency, and tuning resolution.

3. The method of claim 1 further comprising the step of determining a value of a variable relating to transmission of the at least one information stream within an assigned spectrum slice.

4. The method of claim 3 wherein a service corresponding to the at least one information stream is a managed object, the determining step comprising the step of getting a value of a defined variable pertaining to the managed object.

5. The method of claim 4 wherein each of said assigning and reassigning steps comprises the step of setting a value of a defined variable pertaining to the managed objects.

6. The method of claim 1 further comprising the step of communicating the new spectrum slice to a user station.

7. The method of claim 1 wherein the step of reassigning at least one information stream to a new spectrum slice is performed automatically by a network controller.

8. The method of claim 1 wherein the step of reassigning at least one information stream to a new spectrum slice is performed manually by a network operator.

9. The method of claim 1 further comprising the step of determining a level of usage of at least one service, the reassigning step being performed in response to the level of usage.

10. The method of claim 9 wherein the determining step comprises the step of determining levels of usage of all services provided by the network, the reassigning step being performed in response to the levels of usage.

11. The method of claim 1 further comprising the step of determining a level of noise in at least one spectrum slice, the reassigning step being performed in response to the level of noise.

12. The method of claim 1 further comprising the step of determining a priority for a service, the reassigning step being performed in response to the priority.

13. A communication network comprising:

a distribution hub;

user stations;

signal carriers between the distribution hub and the user stations;

a network controller; and independently controlled services each running on the network controller or on at least one of the user stations, each service assigned a spectrum slice in the communication network's frequency spectrum, the independently controlled services comprising service information streams;

at least one of the user stations comprising an interface corresponding to at least one independently controlled service;

the network controller comprising means for controlling transmission spectrum slices for service information streams transmitted from the distribution hub to at least one of the user stations and from at least one of the user stations to the distribution hub and means for changing one or more parameters of the transmission spectrum slices to reallocate one or more service information streams in the communication network's frequency spectrum.

14. The communication network of claim 13 wherein the distribution hub comprises a digital transmitter.

15. The communication network of claim 13 wherein the distribution hub comprises an analog transmitter.

16. The communication network of claim 13 wherein each user station comprises a television interface.

17. The communication network of claim 13 wherein each user station comprises a telephone interface.

18. The communication network of claim 13 wherein each user station comprises a computer interface.

19. The communication network of claim 13 wherein each user station comprises a utility interface.

20. The communication network of claim 13 wherein the signal carriers comprise coaxial cable.

21. The communication network of claim 20 wherein the signal carriers further comprise fiber optic cable.

22. The communication network of claim 13 wherein the means for controlling and the means for changing comprises a spectrum management application within a network management system.

23. The communication network of claim 22 wherein the spectrum management application interfaces with the network according to a predetermined protocol.

24. The communication network of claim 23 wherein the predetermined protocol is SNMP, SNMPv2, or CMIS/CMIP.

25. The communication network of claim 22 wherein the independently controlled services each comprise objects managed by the spectrum management application.

26. A method of controlling the transmission of multiple forward information streams and multiple reverse information streams in a communication network, the information streams corresponding to a plurality of services provided by the network, the forward information streams being sent to user stations and the reverse information streams being received from the user stations, the method comprising the steps of:

assigning to each forward information stream and each reverse information stream at least one spectrum slice within a predetermined frequency spectrum;

transmitting the information streams over the communication network within the information streams' assigned spectrum slices;

reassigning at least one forward information stream or one reverse information stream a new spectrum slice within the predetermined frequency spectrum; and transmitting the information streams over the communication network within the information streams spectrum slices.

27. The method of claim 26 wherein each of said assigning and reassigning steps comprises setting one or more parameters of a spectrum slice, a parameter being tuning range, spectrum slices width, spectrum slice center frequency, or tuning resolution.

28. A method of controlling the transmission of multiple information streams in a communication network, the method comprising the steps of:

generating a plurality of information streams within a plurality of independently controlled services;

assigning to each information stream at least one spectrum slice within a predetermined frequency spectrum;

transmitting the information streams over the communication network within the information streams' assigned spectrum slices;

reassigning at least one information stream to a new spectrum slice within the predetermined frequency spectrum; and transmitting the information streams over the communication network within the information streams' assigned spectrum slices.

29. The method of claim 28 wherein each of said assigning and reassigning steps comprises setting one or more parameters of a spectrum slice, a parameter being tuning range, spectrum slice width, spectrum slice center frequency, or tuning resolution.

* * * * *